Patented Oct. 19, 1954

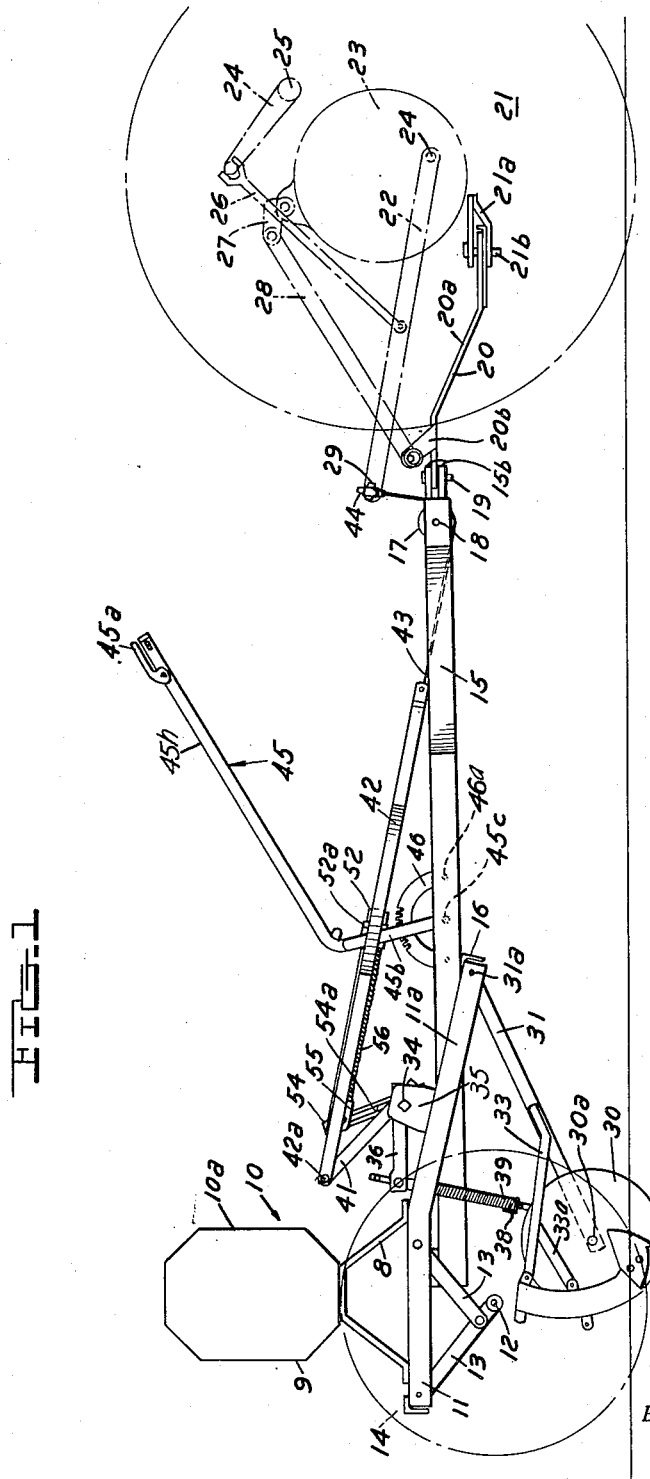

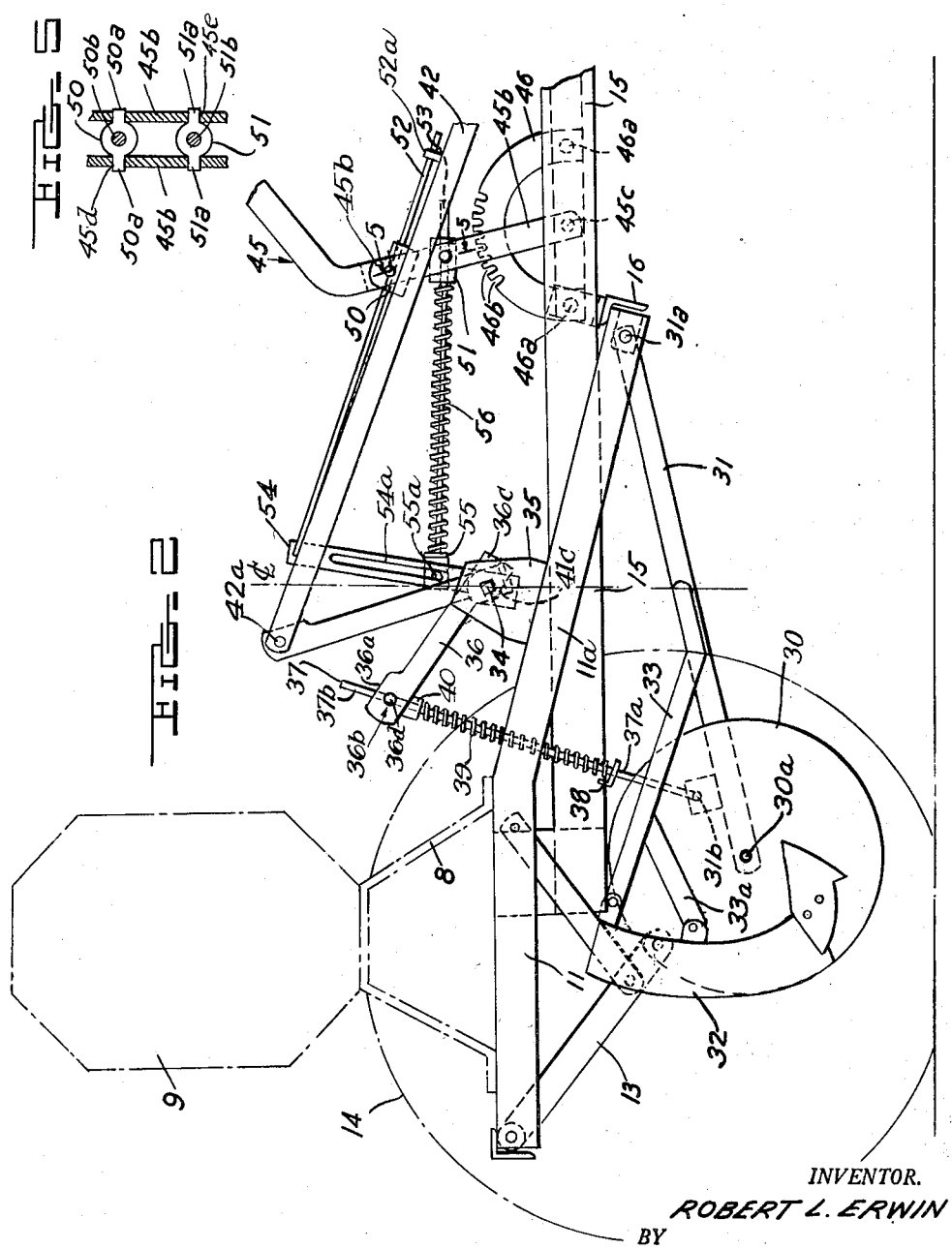

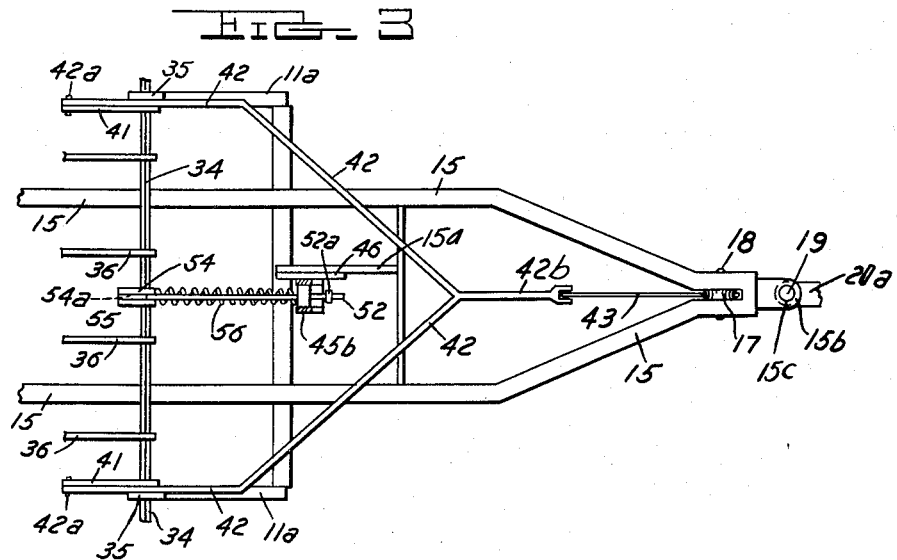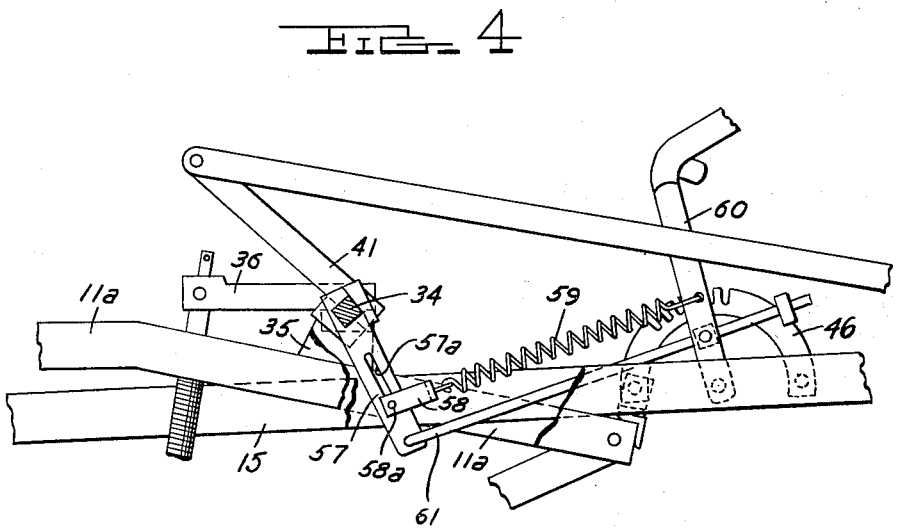

2,691,934

UNITED STATES PATENT OFFICE 2,691,934

SPRING DEVICE FOR GROUND TOOLS

Robert L. Erwin, Royal Oak, Mich., assignor, by mesne assignments, to Ford Motor Company, Dearborn, Mich., a corporation of Delaware Application August 3, 1950, Serial No. 177,496

2 Claims. (Cl. 97—245)

This invention relates to an improved tensioning device for farm implements and particularly for the furrow opening elements of grain drills or planters for obtaining uniform ground penetration.

In planting grain with grain drills, the furrow opening discs meet with variable soil resistances as the drill is towed behind the tractor, which causes the furrow opening elements to raise or lower in response to such varying soil resistances. Accordingly, the grain will be sown at variable depths thereby contributing to producing an uneven stand of grain because of variations in germination and growth. In order to overcome this problem, heretofore heavy springs have been utilized to force the furrow opening discs into the ground but no effect has been made to relieve this tension as the drill is raised to the non-operating position.

At the end of a run across the field, the furrow opening elements of the drill should be capable of being readily raised from the ground and the seeding operation shut off while the drill is turned about for making a run in the other direction. Considerable operator attention and maneuvering is required for the operator to turn the tractor and raise the furrow opening elements of the tractor simultaneously. Accordingly, it is obviously desirable that a lifting mechanism powered by the tractor be employed to raise such furrow opening elements against the bias of the tensioning springs with but a minimum of attention and effort on the part of the operator.

It is therefore an object of this invention to provide an improved tensioning device for a grain drill to positively hold the furrow opening elements of a farm implement in ground engagement.

Another object of this invention is to provide an improved tensioning device for farm implements to produce a downward bias on the ground working elements of greatest force when the ground working elements are in operating position and of substantially lesser force when such elements are in a raised position.

A further object of this invention is to provide an improved power operated lifting arrangement for raising the ground engaging elements of a farm implement to provide substantially automatic lifting of ground engaging elements of a farm implement with a minimum of operator effort.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

On the drawings:

Fig. 1 is a side elevational view of a grain drill embodying the improved tensioning device of this invention shown attached to a tractor and incorporating a lifting mechanism utilizing the power lifted hitch links of a well known type of tractor for raising the ground engaging elements of the drill.

Fig. 2 is an enlarged scale side elevation view illustrating the ground engaging elements of the implement in a raised position.

Fig. 3 is a detail plan view of the tongue structure.

Fig. 4 illustrates a tensioning device embodying a modification of this invention.

Fig. 5 is a sectional view taken on the plane 5—5 of Fig. 2.

As shown on the drawings:

In Fig. 1 there is shown a grain drill indicated generally by the numeral 10 which embodies the improved tensioning device of this invention. Grain drill 10 comprises a transversely extending frame structure 11 which is supported on a transverse axle 12 by a plurality of depending braces 13 secured to such axle, and the axle 12 is in turn respectively supported at its ends by transport wheels 14. A transversely extending hopper 9 is mounted on top of frame 11 by brackets 8. A longitudinally disposed tongue member 15 is suitably connected to frame structure 11 shown in Figs. 1 and 2.

Tongue 15 is preferably constructed of angle iron in the form of a wish-bone and the forward ends 15a (Fig. 3) converge and are transversely spaced apart to define a narrow groove. A sheave 17 is rotatably mounted between the converging ends of the tongue 15 by a transverse pin 18, as shown in Figs. 1 and 3. A pair of lugs 15b are welded to the forward end of tongue 15 in horizontally disposed relationship and such lugs are spaced apart vertically and in aligned relationship. A vertically disposed hole 15c is provided in each of the lugs 15b through which a clevis pin 19 is inserted to connect such tongue to a rearwardly disposed hitch bar 20 secured to a tractor 21.

Hitch bar 20 is provided with a downwardly offset portion 20a so that the forward end of such bar can be connected to the customary tractor clevis hitch 21a provided substantially underneath the rear axle housing. A clevis pin 21b effects the connection. Tractor 21 is of a well known type and is provided with what is known in the art as a three point hitch linkage comprising a pair of transversely spaced, vertically swingable hitch links 22 trailingly pivoted to the rear axle housing 23 as at 24. A pair of lift arms 24 are secured to a transverse shaft 25 and such shaft is rotated by a built-in hydraulically operated ram (not shown) to raise lift arms 24. A pair of rods 26 respectively effect connection between arms 24 and hitch links 22 whereby links 22 are raised in response to lifting of arms 24. A substantially L-shaped lug 27 provided on the top of axle housing 23 pivotally mounts an upper link 28. Link 28 is connected at its rear end to an upstanding arm 20b provided near the rear of bar 20 as shown in Fig. 1 to support such bar. A transverse drawbar 29 is mounted between the ends of hitch links 22 for a purpose to be later described. As is customary, a plurality of transversely spaced furrow opening discs 30 are provided and each of the furrow opening discs 30 is rotatably supported on an upwardly and forwardly sloping arm 31 by a transverse bolt 30a. The forward end of arm 31 is pivoted to frame portion 11a by a transverse bolt 31a. A seed boot 32 is supported adjacent each disc 30 by braces 33 and 33a. Brace member 33 slopes downwardly and forwardly for rigid connection to arm 31 as by welding. Depending arm 33a is secured by welding to brace 33.

A transversely extending rocker shaft 34 is mounted in a plurality of upstanding brackets 35 welded to longitudinal portions 11a of frame structure 11. Above each disc 30, a rocker arm 36 is nonrotatably secured to shaft 34 by a clamp member 36c and such arm projects rearwardly as shown in Figs. 1 and 2, terminating in a yoke shaped end portion 36a. A transverse pin 36b is pivotally secured in the yoke ends of rocker arm 36 and a transverse hole 36d is provided therein through which a downwardly directed rod 37 is inserted. The lower end of rod 37 is pivotally connected to an upstanding lug 31b provided on top of arm 31. A spring seat 38 is mounted on rod 37 adjacent the bottom end of such rod as shown in Fig. 2 and a transverse pin 37a secures spring seat 38 in a selected position against vertical displacement in a downward direction. A helical spring 39 surrounds rod 37, the lower end of such spring resting on spring seat 38 and the upper end abutting a collar 40, which in turn, abuts the underside of yoke ends 36a. Rod 37 projects upwardly above rocker arm 36 and a transverse pin 37b is provided near the top of such rod to prevent rod 37 from passing downwardly through transverse pin 36b.

Spring biased rod 37 is provided to permit upward pivotal movement of furrow opening disc arm 31 about bolt 31a in the event such disc strikes an unyielding obstruction in the ground thereby preventing damage to the disc.

A pair of lifting levers 41 are secured to rocker shaft 34 by clamp members 41a as shown in Fig. 2 in transversely spaced relationship as shown in Fig. 3. A forwardly projecting yoke shaped member 42 is respectively pivotally connected at its ends to lifting levers 41 by transverse bolts 42a. Yoke 42 terminates in a stem portion 42b and a cable 43 is connected to the forward end of stem portion 42 in a suitable manner. Cable 43 passes around the underside of sheave 17 and is suitably connected to tractor drawbar 29 as shown at 44. Raising the tractor hitch links 22 by actuation of lift arms 24 will raise drawbar 29 thereby pulling cable 43 forwardly thus rotating levers 41 in a clockwise direction as shown in Figs. 1 and 2. Levers 41 therefore effect clockwise rotation of shaft 34 thereby raising rocker arms 36 to effect lifting of discs 30 to the position shown in Fig. 2.

For controlling penetration of discs 30, a depth adjusting lever 45 is provided and such lever has a forwardly sloped portion 45h which extends within the vicinity of the tractor seat so that the tractor operator may readily adjust the setting of the lever as will be presently described. The rear end of lever 45 terminates in a substantially vertical portion 45b which is pivotally connected to a longitudinal frame member 15a by a transverse bolt 45c. An upstanding quadrant member 46 is secured to member 15a by a pair of rivets 46a adjacent vertical portion 45b of lever 45. A plurality of notches 46b are provided on the peripheral edge of quadrant 46 which are engageable by a conventional detent member (not shown) controlled from the upper end of lever 45 in conventional fashion by auxiliary handle 45a. Vertical portion 45b of lever 45 comprises two spaced apart bar members as best shown in Fig. 3 having vertically spaced, transverse holes 45d and 45e. A pair of cylindrical rod guides 50 and 51 are respectively rotatably mounted between bars 45b by diametrically opposed pins 50a and 51a respectively provided on the guides 50 and 51 which are insertable in holes 45d and 45e. Guides 50 and 51 are respectively provided with axial bores 50b and 51b for the reception of a pair of rods 52 and 53.

A depth adjusting arm 54 is fixed to the center of square shaft 34 and such arm is provided with a longitudinal slot 54a. Rod 52 is pivotally connected at its rear end to the top of arm 54 and a stop collar 52a is secured adjacent the forward end of rod 52 to limit the rotary movement of depth adjusting arm 54 in a counter-clockwise direction. The rear end of guide rod 53 is secured to a clevis 55 which receives arm 54. Clevis 55 is slidably secured to arm 54 by a transverse pin 55a which slidably engages slot 54a in arm 54. A helical compression spring 56 surrounds rod 53 and one end of such spring abuts clevis 55 while the other end abuts rod guide 51. The bias of spring 56 thus tends to rotate arm 54 in a counter-clockwise direction as shown in Figs. 1 and 2.

The throw of arm 54 is governed by the depth adjusting lever 45. Such lever may be secured in any selected one of a plurality of angular positions provided by the notches 46b provided in quadrant 46 by engaging the detent (not shown) with the selected notch.

In Fig. 1 the disc furrow opener 30 is shown in ground engaging position and in such position spring 56 has biased arm 54 in a counter-clockwise direction to the position shown in such figure. The force of spring 56 is transmitted to shaft 34 through arm 54 thus forcing rocker arm 36 to compress spring 39 and hence maintain furrow openers 30 in the ground. Clevis 55 in this position of the improved tensioning device will be located at the upper end of slot 54a, whereat spring 56 acts on arm 54 at a point of maximum lever arm from the fulcrum point of arm 54. When it is desired to raise furrow openers 30, the tractor hydraulic control lever (not shown) is operated by the tractor operator to actuate tractor lift arms 24 thereby raising hitch links 22. This in turn draws cable 43 and yoke 42 forwardly, thereby rotating levers 41 and arm 54 in a clockwise direction to compress spring 56. After arm 54 is rotated in a clockwise direction past vertical, clevis 55 moves downwardly along slot 54a and as such spring approaches the fulcrum of arm 54, a constantly decreasing force is thus required to compress spring 56. As the effective point of application of the spring force exerted by spring 56 is moved nearer the pivot point as arm 54 moves past the center, the distance the spring must be deflected is likewise reduced, hence a shorter spring can be utilized.

In Fig. 4 there is shown a modification of the tensioning device illustrated in Figs. 1 and 2. Such modification may be applied to the same grain drill shown in the above-mentioned figures. In this modification, a depending depth adjusting arm 57 is secured to shaft 34 and a longitudinal slot 57a is provided therein. A clevis member 58 surrounding such arm is secured to such arm by a transverse pin 58a which rotatably engages slot 57a in order that such clevis will be slidably connected to arm 57. The same implement lift arms 41 and rocker arms 36 are utilized as before described. A tension spring 59 is connected at one end to clevis 58 and at its other end to a lever 60. Lift levers 41 and rocker arm 36 are utilized with this modification and are located substantially in the same position. With this modification depth adjusting lever 60 is utilized which is substantially the same as depth adjusting lever 45. A stop rod 61 is connected to depth adjusting lever 60 in the same manner as stop rod 52 is secured to depth adjusting lever 45. Thus the throw or movement of arm 57 can be adjusted to vary the working depth of furrow opening disc 30. As the operation of the modification shown in Fig. 3 is otherwise identical with that of the arrangement shown in Figs. 1 and 2, no further description thereof is believed necessary other than to point out that again the effective lever arm of spring 59 is greatly reduced as lift arm 41 is pivoted in a clockwise direction to raise the furrow opening elements.

From the foregoing description it will be apparent that there is here provided a tensioning device for applying spring pressure of large magnitude to ground opening elements of a farm implement which will insure substantially even penetration of the soil thereby providing improved uniformity of planting. The spring tension on the ground engaging elements is however relievable as such elements are lifted to a raised position thereby facilitating the raising thereof. This invention also permits the use of a shorter length tensioning spring through the shiftable connection of such spring to the lever arm transmitting the force of such spring, whereby a shorter than normal spring may be utilized, which results in an added economy and increased spring life.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In an implement having a frame and a ground working tool pivoted on the frame for vertical movement, a transverse shaft pivotally mounted on the frame, means connecting said shaft to the ground working tool to control the vertical position of said tool with rocking of the shaft, an arm fixed to said shaft and extending generally radially therefrom, said arm having a slot extending generally radially from said shaft, said arm being swingable in opposite directions between positions on opposite sides of a vertical plane through said shaft, the arm assuming one of said positions when the tool is lowered for ground working and assuming the other position when the tool is raised for transport, a spring connected to said frame and to said arm urging said arm and shaft in one direction to lower said tool and yieldingly maintain it lowered, the connection of said spring to said arm including an element slidably mounted in said slot in said arm, said slot constituting the path of movement of said element, said element being positioned outwardly on said arm away from said shaft when said arm assumes the position in which the tool is lowered for ground working, and means for rocking said shaft in the opposite direction to raise the tool and swing the arm past said vertical plane, said element sliding along said arm toward said shaft after the arm has swung past said vertical plane to the other position; whereby the effective force against said last named means is substantially reduced.

2. In an implement having a frame and a ground working tool pivoted on the frame for vertical movement, a transverse shaft pivotally mounted on the frame, means connecting said shaft to the ground working tool to control the vertical position of said tool with rocking of the shaft, an arm fixed to said shaft and extending generally radially therefrom, said arm being swingable in opposite directions between positions on opposite sides of a vertical plane through said shaft, the arm assuming one of said positions when the tool is lowered for ground working and assuming the other position when the tool is raised for transport, a spring connected to said frame and to said arm urging said arm and shaft in one direction to lower said tool and yieldingly maintain it lowered, the connection of said spring to said arm including an element slidably mounted for movement along a path extending generally radially of said shaft, said element being positioned outwardly on said arm away from said shaft when said arm assumes the position in which the tool is lowered for ground working, and means for rocking said shaft in the opposite direction to raise the tool and swing the arm past said vertical plane, said element sliding along said arm toward said shaft after the arm has swung past said vertical plane to the other position; whereby the effective spring force against said last named means is substantially reduced.

References Cited in the file of this patent

UNITED STATES PATENTS

| Number | Name | Date |
|---|---|---|
| 304,713 | Elder | Sept. 9, 1884 |
| 348,208 | Hench et al. | Aug. 31, 1886 |
| 610,030 | Cobb | Aug. 30, 1898 |
| 755,737 | Block | Mar. 29, 1904 |
| 860,311 | Mitchell et al. | July 16, 1907 |
| 904,232 | Schutt | Nov. 17, 1908 |
| 912,826 | Deterding | Feb. 16, 1909 |
| 2,290,245 | Mott | July 21, 1942 |
| 2,369,436 | Court | Feb. 13, 1945 |
| 2,416,403 | Paul | Feb. 25, 1947 |
| 2,520,345 | Starr | Aug. 29, 1950 |